T. H. MACDONALD.
METAL SOUND RECORD.
APPLICATION FILED MAY 14, 1910.
1,114,010.
Patented Oct. 20, 1914.
Fig. 1ᵃ
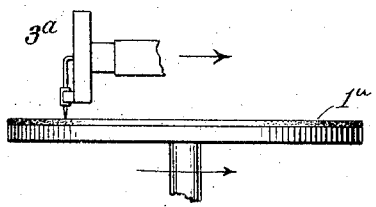
Fig. 1
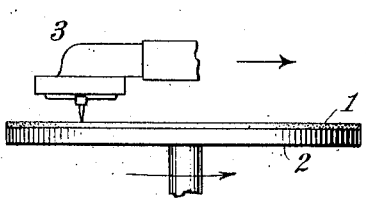
Fig. 2
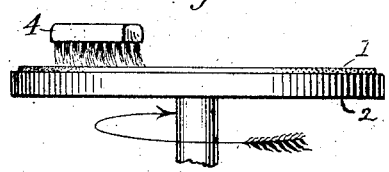
Fig. 3
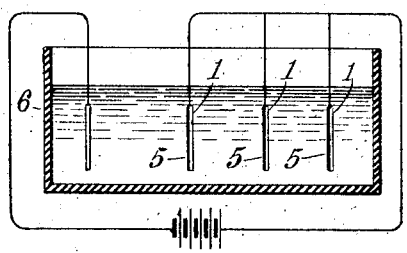
Fig. 6
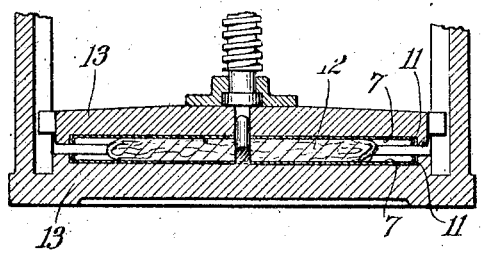
Fig. 4
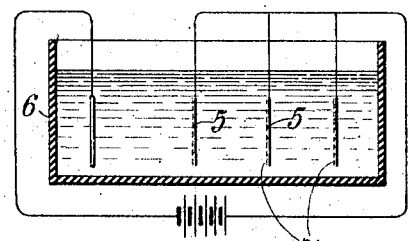
Fig. 7
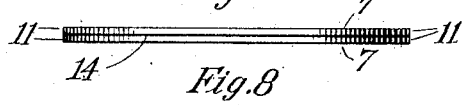
Fig. 8
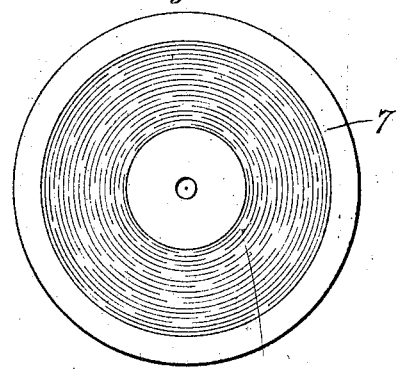
Fig. 5
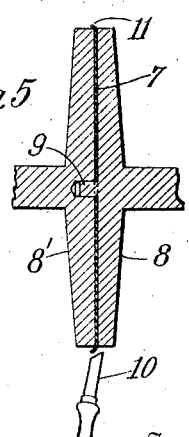

UNITED STATES PATENT OFFICE.

THOMAS H. MACDONALD, OF BRIDGEPORT, CONNECTICUT, ASSIGNOR TO AMERICAN GRAPHOPHONE COMPANY, OF BRIDGEPORT, CONNECTICUT, A CORPORATION OF WEST VIRGINIA.

METAL SOUND-RECORD.

1,114,010.   Specification of Letters Patent.   Patented Oct. 20, 1914.

Application filed May 14, 1910. Serial No. 561,311.

*To all whom it may concern:*

Be it known that I, THOMAS H. MACDONALD, a citizen of the United States of America, and resident of Bridgeport, Connecticut, have invented a new and useful Improvement in Metal Sound-Records, which invention is fully set forth in the following specification.

The object of this invention is to produce a sound-record of greatly improved durability without any sacrifice of quality.

It is well known that with the sound-records now on the market each reproduction causes deterioration, and that after several hundred reproductions or sometimes even less the record becomes so poor as to be practically worthless. It has long been desired to obtain for permanent preservation records of celebrated personages, great singers, etc. Such records can be preserved for a long time, perhaps indefinitely; but each use thereof, for audible reproduction, to that extent tends to destroy them. By my invention I produce a permanent sound-record which can be used thousands of times without any appreciable deterioration, and which can be preserved for indefinite ages, yet without any sacrifice of quality.

My invention will be best understood by reference to the annexed drawings that illustrate preferred methods of procedure, the disks shown in the drawings being somewhat exaggerated in thickness for sake of clearness and the drawings themselves not being made to scale but merely as illustrations.

In the drawings Figure 1 is an elevation intended to represent conventionally the production of an "original" disk sound-record of the vertically-undulating type, and Fig. 1$^a$ is a similar view representing the production of an "original" disk sound-record of the laterally-undulating type; Fig. 2 is an elevation indicating the operation of rendering the surface of such "original" electro-conductive; Fig. 3 is a transverse vertical section through a conventional representation of an electro-plating bath for producing the electroplate masters or "negatives" of the "originals", and Fig. 4 is a similar view representing the production from such negatives of electroplate "positives"; Fig. 5 is a sectional view of a pair of rotating chucks, indicating the turning back of the circular edge or rim of such metal "positives"; Fig. 6 is a vertical section through a press, representing the pressing-up of the double-faced sound-record; Fig. 7 is an edge view, and Fig. 8 a face view, representing the completed record.

Preferably the metallic record-surfaces are produced as follows: In Fig. 1, 1 represents a disk of wax-like material carried upon the revolving turn-table 2, while 3 indicates a recording-device traveling slowly across the face of the revolving tablet 1. The recorder is arranged with its diaphragm practically horizontal, so that its stylus vibrates up and down to produce in the surface of tablet 1 a spiral record-groove having vertical undulations corresponding to sound-waves,— a record-groove of the type disclosed in the Bell and Tainter Patent No. 341,214, May 4, 1886.

Referring to Fig. 1$^a$ as a modification, the slowly traveling recorder 3$^a$ has its diaphragm practically vertical, and its stylus vibrates laterally to produce in the tablet 1$^a$ a record-groove having lateral undulations or "zigzags" corresponding to sound-waves, as described in the Jones Patent No. 688,739, December 10, 1901. The surface of the original record 1 (or 1$^a$) is then rendered electro-conductive in any well-known manner, as by coating it carefully with finely powdered graphite, which may be brushed over the revolving tablet 1, by means of a brush 4, as indicated in Fig. 2. Thereafter, a metallic reverse or negative 5 is obtained from the original, by electroplating in the well-known manner.

Fig. 3 represents conventionally a plating-bath 6 containing a number of originals 1 having an electrodeposited coating or metal plate 5 adhering to each. These electroplates 5 are separated from the originals, and present a reverse of the original sound-record; and this reverse-surface is preferably cleaned, nickel-plated (if of copper), and polished. From these reverse electroplates 5, positive metallic records are then obtained in any well-known manner, as by repeating the electroplating, which is illustrated by Fig. 4, which shows an ordinary plating-bath 6 containing a number of the metallic negatives 5 upon which the metallic positives 7 are being deposited by electrolysis in the well-known manner. These positives 7 are separated from the negatives 5, and present exact copies of the original records produced in the tablet 1. These positive metal copies 7 will be preferably cleaned, nickel-plated (if of copper) and polished or buffed, to constitute the metallic record-surfaces of the finished article.

The object of the steps described in the preceding paragraph is to obtain metallic sound-records capable of audible reproduction upon the talking-machine. Although I have described the particular steps of first recording in a wax-like material and subsequently obtaining therefrom electroplates or "positives," my invention is not limited to the employment of that precise method or those particular steps, since any method by which metal sound-records are produced is within the particular spirit of the present invention. For instance, the separate metal sheets or records may be produced as disclosed in my Patent No. 836,646, granted Nov. 20, 1906. The metal records 7 are comparatively thin sheets of metal. The edge of each record is now turned backward and inward, as indicated by Fig. 5, in which 8—8', as indicated in Fig. 5 of the drawings represent two revolving circular heads or chucks, a little smaller in diameter than the metal disk 7. Each of the disks 7 is in turn centered between the two chucks, as by means of a stud 9 projecting from the center of one chuck and passing through a center hole in the disk 7 into a corresponding seat into the other chuck. 10 indicates a tool pressed against the protruding edge 11 of the revolving metal disk 7, which is thereby bent as indicated. Assuming that the record-groove is on the right hand of the disk 7, as appearing in Fig. 5, then the edge 11 is flanged backward (to the left) in Fig. 5. And thereafter the extreme edge of this rim 11 is bent inward to produce a slight lip which may be accomplished by further use of a tool against the revolving edge of the rim. In cross-section this backward and inward bending of rim 11 would appear as a slight hook. See Fig. 6. Referring to Fig. 6, two of such metal records 7, preferably of different selections, are placed back to back, with their inturned rims 11—11 toward each other; and between the two is placed a lump or mass 12 of suitable material, preferably the thermoplastic material or "stock" (earthy matter blended with shellac or other gum as a binder) employed in making ordinary disk records. The whole is then inserted between the jaws 13—13 of a suitable press, being preferably fitted in circular dies provided with circular depressions or seats; and the press is operated to compress the two metal disks together and squeeze the material 12. The pressure of the jaws 13—13 causes the thermo-plastic mass 12 to spread radially outward, until it abuts against the rims of the metal shells and their inturned lips; and thereupon the rims are forced outward by the oncoming material 12, until they assume the full cylindrical outline of the confining walls of the dies, by which time the rims 11—11 will have come together. More or less of the extreme inturned lip at the very edge of the rims will still remain for locking into the interposed material 12, which by this time will have resumed its normal hardness. The article so produced, shown in edge view by Fig. 7 and in face view by Fig. 8, appears to be a disk of metal; each face is of metal and the cylindrical edge is likewise of metal. The joint between the two rims 11—11 appears as an arrow (black) line 14. If desired the two record-surfaces of the finished article may be again cleaned and buffed, and the article is now ready for use.

My invention is not limited to the particular methods of forming metallic records shown and described, the limits of the invention being defined in the annexed claims.

Having thus described my invention, I claim:

1. As an article of manufacture, a double-faced disk sound-record consisting of two metallic surfaces each provided at its rear with an inturned lip, and a connecting layer of material that will spread under pressure uniting said lips.

2. A two part sound-record consisting of two metal shells each containing a sound-record on its face and an inturned lip at its rear, and non-metallic material that will spread under pressure uniting said lips.

3. A double-faced sound-record consisting of two metallic shells each having a sound-record on its face and having an inturned lip at its rear, and an interposed material that will spread under pressure engaging said lips and locking said shells together.

In testimony whereof I have signed this specification in the presence of two subscribing witnesses.

THOMAS H. MACDONALD.

Witnesses:
A. B. KEOUGH,
C. W. HEDBERG.